(12) United States Patent
Wang et al.

(10) Patent No.: US 8,945,657 B2
(45) Date of Patent: Feb. 3, 2015

(54) DEHYDRATED PULP SLURRY AND METHOD OF MAKING

(75) Inventors: James J. Wang, Sugar Land, TX (US); Douglas A. Bippert, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 118 days.

(21) Appl. No.: 12/820,535

(22) Filed: Jun. 22, 2010

(65) Prior Publication Data

US 2011/0311708 A1   Dec. 22, 2011

(51) Int. Cl.
*A23L 1/212* (2006.01)
*A23L 2/02* (2006.01)
*A23L 2/52* (2006.01)

(52) U.S. Cl.
CPC .............. *A23L 1/2128* (2013.01); *A23L 2/02* (2013.01); *A23L 2/52* (2013.01)
USPC ........... 426/615; 426/431; 426/481; 426/489; 426/495; 426/616; 426/640

(58) Field of Classification Search
CPC ......... A23L 1/212; A23L 1/2128; A23L 3/40; A23L 3/50; A23L 1/015
USPC ......... 426/615, 640, 624, 616, 441, 431, 489, 426/481, 495
See application file for complete search history.

(56) References Cited

U.S. PATENT DOCUMENTS

| | | | |
|---|---|---|---|
| 4,413,017 A | | 11/1983 | Loader |
| 4,451,489 A | * | 5/1984 | Beale et al. .................. 426/254 |
| 4,477,481 A | * | 10/1984 | Eisenhardt et al. ........... 426/590 |
| 5,137,744 A | * | 8/1992 | Cagley et al. .................. 426/615 |
| 5,202,122 A | | 4/1993 | Graves et al. |
| 5,620,565 A | * | 4/1997 | Lazorisak et al. .............. 162/72 |
| 6,190,718 B1 | | 2/2001 | Eek |
| 6,544,577 B1 | | 4/2003 | Chu et al. |
| 6,602,994 B1 | | 8/2003 | Cash et al. |
| 6,645,546 B2 | * | 11/2003 | Roney et al. .................. 426/640 |
| 6,727,452 B2 | | 4/2004 | Schrader |
| 7,094,317 B2 | * | 8/2006 | Lundberg et al. ............... 162/90 |
| 7,115,298 B2 | | 10/2006 | Keithly et al. |
| 7,629,010 B2 | | 12/2009 | Passarelli et al. |
| 7,629,011 B2 | * | 12/2009 | Suasin et al. .................. 426/482 |
| 2004/0045687 A1 | | 3/2004 | Shannon et al. |
| 2006/0159833 A1 | | 7/2006 | Radatti |
| 2011/0293814 A1 | * | 12/2011 | Alexandre et al. ............ 426/577 |

FOREIGN PATENT DOCUMENTS

JP    S59-34861    6/2010

OTHER PUBLICATIONS

Dan A. Kimball, "Citrus Processing: A Complete Guide, Second Edition", Aspen Publishers, United States (1999), 92-96.

* cited by examiner

*Primary Examiner* — Helen F Heggestad
(74) *Attorney, Agent, or Firm* — Dentons US LLP

(57) ABSTRACT

The present invention relates to a process for making a dehydrated pulp slurry comprising the steps of de-sugaring a pulp slurry, said de-sugaring process producing a pulp slurry with substantially no sugar content, and dehydrating said pulp slurry. The dehydrated pulp slurry produced by this process is such that, when reconstituted, the color, shape, and texture of the pulp contained therein is substantially the same as it was prior to undergoing the dehydrating step.

22 Claims, No Drawings

DEHYDRATED PULP SLURRY AND METHOD OF MAKING

FIELD OF THE INVENTION

The present invention provides a novel dehydrated pulp slurry and a novel process for making said dehydrated pulp slurry. The process of the present invention comprises a first de-sugaring step, wherein substantially all the sugars are removed from a pulp slurry, and a subsequent dehydrating step, wherein a de-sugared pulp slurry is dehydrated to no more than about 60 wt %. The novel dehydrated pulp slurry produced by the process of the present invention is such that, when reconstituted, the color, shape, and texture of the pulp contained therein is substantially the same as it was prior to undergoing the dehydrating step.

BACKGROUND OF THE INVENTION

In the beverage industry, it is common to process fruit in order to obtain extracted fruit juice and fruit pulp for use in a wide variety of beverages. The fruit juice can be drunk alone or can be combined with other ingredients. The extracted fruit pulp, also known as pulp slurry, is similarly desirable in that it can be combined with a juice base or added to fruit juice to further increase its fruit pulp content. In fact, there is an increasing demand for pulpy orange juice. Because fruit processing and beverage manufacturing facilities may not be located on the same premises, there is a need to ship extracted fruit pulp between locations.

Current fruit pulp shipping methods require the pulp slurry to be frozen during processing and maintained at sub-freezing temperatures during both transportation and storage. Typical fruit pulp extraction processes result in a pulp slurry product that can have as much as 90 wt % water content and, therefore, if not immediately used, the product must be frozen so that spoilage does not occur. There are two significant drawbacks to such extraction and freezing processes. First, there are substantial energy and monetary costs associated with shipping the significant water content in pulp slurry that, instead, could be supplied at the beverage manufacturing facility. Second, there are significant energy and monetary costs associated with maintaining pulp slurry in a frozen state during storage and transportation; a cost that increases with the time the pulp slurry is in storage and transit.

Cost and energy savings can be realized if the pulp slurry is dehydrated prior to shipping and subsequently rehydrated at the manufacturing facility when it is ready for use. A reduction in pulp slurry water content would not only reduce the weight per unit volume of pulp slurry being shipped, but it would also obviate the need to store and transport pulp slurry in a frozen state. Unfortunately, current methods for dehydrating pulp slurry result in a pulp slurry product that is undesirable to beverage consumers. Current dehydrating methods produce irreversible structural changes and/or chemical changes in pulp slurry such that the rehydrated pulp slurry does not retain the flavor, structural, and textual characteristics it had prior to undergoing dehydration. This result leads to a pulp slurry product that has a significantly reduced economic value. In particular, pulp slurry that has undergone dehydration is of such poor quality that it is generally used only as animal feed, fertilizer, and a source of food additives such as pectin.

The present invention provides a novel dehydrated pulp slurry and a novel process for making said dehydrated pulp slurry. The process of the present invention comprises a first de-sugaring step, wherein the sugars are removed from a pulp slurry, and a subsequent dehydrating step. The novel dehydrated pulp slurry produced by the process of the present invention is such that, when rehydrated, the color, taste, and texture of the dehydrated pulp slurry of the present invention is substantially the same as it was just prior to undergoing the dehydrating step.

SUMMARY OF THE INVENTION

The present invention relates to a process for making a dehydrated pulp slurry comprising the steps of de-sugaring a pulp slurry, said de-sugaring process producing a pulp slurry with substantially no sugar content, and dehydrating said pulp slurry. The dehydrated pulp slurry produced by this process is such that, when reconstituted, the color, shape, and texture of the pulp contained therein is substantially the same as it was prior to undergoing the dehydrating step.

DETAILED DESCRIPTION OF THE INVENTION

While the specification concludes with the claims particularly pointing out and distinctly claiming the invention, it is believed that the present invention will be better understood from the following description.

All percentages, parts and ratios are of the total composition, unless otherwise specified. Except where specific examples of actual measured values are presented, numerical values referred to herein should be considered to be qualified by the word "about".

As used herein, "comprising" means that other steps and other ingredients which do not affect the end result can be added. This term encompasses the terms "consisting of" and "consisting essentially of". The compositions and methods/processes of the present invention can comprise, consist of, and consist essentially of the essential elements and limitations of the invention described herein, as well as any of the additional or optional ingredients, components, steps, or limitations described herein.

The compositions of the present invention can comprise, consist essentially of, or consist of, the essential components as well as optional ingredients described herein. As used herein, "consisting essentially of" means that the composition or component may include additional ingredients, but only if the additional ingredients do not materially alter the basic and novel characteristics of the claimed composition or method.

All publications cited herein are hereby incorporated by reference in their entirety. The term "pulp" or "pulp sac" or "juice vesicles" or "juice sacs" is defined herein as the membranous content of the fruit's endocarp.

The term "pulp slurry" refers to the slurry that is the fruit's pulp and its constituent juice. Particularly, it refers to the citrus material after it has been extracted from fruits and dewatered by a finisher that may contain about 40% to about 65% pulp cells.

The term "dehydrated pulp slurry" is defined herein as a pulp slurry that has been dewatered and/or dried.

The term "Brix" or "Brix value" or "° Bx" is defined herein as a measurement of the amount of dissolved sugars per hundred parts aqueous solution and sugar. The Brix value can be measured with a saccharimeter that measures specific gravity of a liquid or more easily with a refractometer.

The term "natural characteristics" is described herein as a reconstitution property of a dehydrated pulp slurry. A dehydrated pulp slurry that has natural characteristics can be reconstituted so that the color, shape, and/or texture of the pulp contained therein is substantially the same as it was prior to undergoing dehydration.

The term "press liquor" is defined herein as the filtrate generated from a dewatering process.

The tem "pulp wash" is defined herein as the filtrate generated in a pulp washing process.

The term "press cake" is defined herein as the retentate of a dewatering process.

The term "pumpability" is defined herein as the ability of a pulp slurry to be moved through a flow conduit by pressure from a pump.

The term "gentle drying" is defined herein as a drying process that does not irreversibly change the color, shape, and/or texture of the pulp in a pulp slurry The term "wt %" is defined herein as percentage by weight.

All percentages, parts, and ratios as used herein are weight of the total composition, unless otherwise specified.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The present invention provides a novel dehydrated pulp slurry and a novel process for making said dehydrated pulp slurry. The process of the present invention comprises a first de-sugaring step, wherein the sugars are removed from a pulp slurry, and a subsequent dehydrating step. The novel dehydrated pulp slurry produced by the process of the present invention is such that, when rehydrated, the color, shape, and texture of the pulp contained therein is substantially the same as it was prior to undergoing the dehydrating step.

De-Sugaring

The inventors have discovered that the de-sugaring step is necessary in obtaining a dehydrated pulp slurry product with natural characteristics. In particular, with respect to reconstitution, the de-sugaring step in the present invention can be used to prevent irreversible changes in the shape and/or texture of pulp in a pulp slurry during dehydration. Without being limited by a theory, it is believed that sugars in a pulp slurry can caramelize during drying, thereby forming a hard-shell that can have an undesirable effect during subsequent dehydration and/or during subsequent reconstitution. During drying, it is believed that the hard-shell can impede the heat transfer of moisture, necessitating longer drying times, which in turn, can further caramelize the sugars in the pulp slurry. Furthermore, it is believed that the hard-shell formed from caramelized sugar is not easily dissolved upon reconstitution and, therefore, such a non-desugared dehydrate pulp slurry can lack natural characteristics. By washing substantially all of the sugar from a pulp slurry prior to drying, it is thought that the said undesirable effects on the pulp slurry can be avoided.

The de-sugaring step of the present invention can comprise pulp washing; a process wherein sugars are removed from a pulp slurry by contacting it with water. The beverage industry has regarded such a process as valuable for its resultant pulp wash. Because it can have a taste similar to a corresponding fruit juice, pulp wash is commonly valued in beverage manufacturing for its use as a flavorant in beverages such as fruit drinks.

Although pulp washing can be a desirable de-sugaring method for its resultant pulp wash, current methods can result in a pulp slurry with a Brix value that is undesirably high. Current pulp washing methods generally remove sugars from a pulp slurry until the Brix value of the pulp slurry is no less than about 5° Bx to about 6° Bx Prior to the present invention, there was little economic incentive in the beverage industry to reduce it further since it was thought that further washing such pulp slurry could result in a pulp wash that has too little flavor content and/or Brix value to be of economic value since the added costs associated with subsequent washing could outweigh the diminished marginal value added to the resulting pulp wash. With respect to the washed pulp slurry, it is common practice in the beverage industry to dehydrate the washed pulp slurry and use it for animal feed, fertilizer, and/or a source of food additives such as pectin, applications for which the Brix value of the source pulp slurry is not economically significant.

In light of the foregoing drawbacks of current washing methods, the de-sugaring process of the present invention can desirably comprise a concurrent multi-stage washing process, a process that can efficiently remove substantially all of the sugars from a pulp slurry. Such a method can comprises a plurality of washing stages, including, but not limited to, a first washing stage and a last washing stage. As a pulp slurry is sequentially conveyed from the first washing stage to the last washing stage, the Brix level of the pulp slurry is lowered at each washing stage by contacting the pulp slurry with water. In such a process, fresh water is used only in the last washing stage and pulp wash water generated from this last washing stage is subsequently used in succeeding prior washing stages up to and including the first washing stage.

While there are many suitable washing stage designs, a desirable washing stage can comprise a wash tank and a filter element. The Brix value of a pulp slurry can be reduced by depositing the pulp slurry in the wash tank element, contacting it with water therein to create a pulp slurry/water mixture, and ultimately filtering said mixture. In some such embodiments of a washing stage, the wash tank can be advantageously coupled to a mixing element that agitates the pulp slurry/water mixture at a ratio of about 1 to about 3 (water to pulp slurry) (vol/vol) for about 20 to about 30 minutes promote the dissolving of sugars. The filter element can comprise various designs including, but not limited to, a fiber filter wherein an impeller can be used to press a slurry/water mixture against a filtration surface comprising a woven polymer fabric. In one embodiment of the present invention, a multi-stage concurrent washing processes comprising three washing stages, each washing stage comprising a wash tank and filter element, is used to remove sugar from a pulp slurry. Generally, the Brix value of the pulp slurry after the final washing stage may be from about 0° Bx to about 1° Bx. In some such embodiments of the present invention, the Brix value of the pulp slurry after the final washing stage may be no more than about 0.1° Bx. In other such embodiments of the present invention, the Brix value of the pulp slurry after the final washing stage may be between about 0.1° Bx and about 0.25° Bx. In yet further such embodiments of the present invention, the Brix value of the pulp slurry after the final washing stage may be between about 0.25° Bx and less than about 0.5° Bx.

Although other de-sugaring methods can be used, a multi-stage concurrent washing process can be desirable because it is generally more efficient than other de-sugaring methods. For example, in a bag washing method, a pulp slurry is placed in a porous bag and, subsequently, the porous bag containing the pulp slurry is washed in a wash tank. The filled bag can be washed until no sugars can be detected in the wash water. This bag washing process, however, may require many wash cycles and can be time consuming. On the other hand, a multi-stage concurrent washing process can generally remove substantially all the sugars from a pulp slurry in fewer wash cycles, thereby increasing the washing efficiency by reducing the amount of time, water, and energy used in the washing process. With respect to a multi-stage concurrent washing process, the number of washing stages will depends upon several factors including, but not limited to, the desired Brix value of a pulp slurry after a final washing stage as well as the particular embodiment of the washing stage used in said washing process. Additionally, factors such as the ratio, temperatures and length of time the water and pulp slurry are mixed may play a factor in the de-sugaring process. For example, the ratio of water to pulp slurry may be from about 2 to about 1 within an ambient water temperature that mixes for about 10 to about 20 minutes.

Desirable starting materials for the de-sugaring step include, but are not limited to, slurries comprising, fresh pulp, aseptic pulp, or thawed pulp, all of which can be obtained during fruit processing by methods that are well known in the art. Said pulp slurries can comprise membranes forming juice sacs as well as other juice soluble solids including, but not limited to, sugar. Although the starting pulp slurry will desirably have a water content of no less than about 80 wt %, a pulp slurry with a lower water content can be used so long as the pulp slurry maintains pumpability.

Dehydration

In light of the foregoing, a goal of the present invention is to produce a dehydrated pulp slurry with natural characteristics. It is also a goal of the present invention, however, to sufficiently dehydrate a pulp slurry so that it can be stored and/or shipped at ambient temperatures without spoilage. Therefore the moisture content of a dehydrated pulp slurry can be no more than about 10 wt %, no more than about 8 wt %, or no more than about 6 wt % of the dehydrated pulp slurry. Such water contents can allow for storage and/or shipment at ambient temperatures without spoilage. Additionally, such moisture contents can result in ideal rehydration times upon reconstitution with an appropriate drying methodology.

The dehydration process of the current invention comprises dewatering a pulp slurry and/or drying a pulp slurry. In the pulp processing industry, water in a pulp slurry can be categorized into three broad groups: free water, vicinal water, and bound water. Free water comprises water in which the pulp and other solid matter of the pulp slurry are suspended. On the other hand, vicinal water comprises the layers of water molecules that are hydrogen bonded to the solid matter in a pulp slurry, while bound water comprises water that is chemically bonded to said solid matter. Without being limited by a theory, it is believed that although both dewatering and drying can reduce free water content and vicinal water content of a pulp slurry, bound water can be reduced only by drying. Therefore, because drying is generally more expensive than dewatering in terms of both monetary and energy costs, the dehydration process of the present invention can advantageously comprise drying dewatering step prior to a drying step.

1. Dewatering

Wherein the dehydration process of the present invention comprises a dewatering step, dewatering can comprise mechanical dewatering, chemical dewatering and/or enzymatic dewatering. Without being limited by a theory, it is believed that while mechanical dewatering is effective in reducing the amount of free water from in a pulp slurry, it is not effective in reducing the amount of vicinal water contained therein. Vicinal water content in a pulp slurry, however, can be reduced using chemical dewatering and/or enzymatic dewatering. Therefore, in light of forgoing considerations of dewatering costs and drying costs, a dewatering process of the present invention can advantageously comprise mechanical dewatering, chemical dewatering and/or enzymatic dewatering.

There are many methods for mechanically dewatering a pulp slurry. Generally, these methods may comprise a mechanical dewatering process, In one such method, a screw presser can be used to remove free water from a pulp slurry. A typical screw presser can comprise a cylindrical dewatering chamber, a first opening, a second opening, and a screw shaft wherein the free volume between the screw threads is reduced from the first opening to the second opening. The cylindrical chamber can comprise a filtration surface. A pulp slurry is continually dewatered over the length of the dewatering chamber by depositing the pulp slurry in the first opening and reducing the volume through which it must pass as it is conveyed from the first end of the screw presser to the second end of the screw presser by rotation of the screw shaft. The mechanically dewatered pulp slurry exits the screw presser at the second end and press liquor exits through the filtration surface.

The porosity of the filtration surface, the angle of screw flights and screw rpm can be advantageously selected so as to increase the efficiency of the dewatering process as well as to mitigate against irreversible structural changes to pulp contained in a pulp slurry. A filtration surface can comprise a variety of filter elements including, but not limited to, a perforated screen or a wedgewire screen. A wedgewire screen can be formed from wedge shaped filter elements that are attached to a frame to form a cylindrical surface wherein the divergent space between adjacent filter elements forms a filter flow space, also known as a slot width. In some embodiments of the present invention, a screw presser comprising a wedgewire screen with a slot width of about 0.016 inches to about 0.018 inches can be used to mechanically dewater a pulp slurry. In other embodiments of the present invention, a screw presser comprising a wedgewire screen with a slot width of about 0.018 inches to about 0.020 inches can may be used to mechanically dewater a pulp slurry. In further embodiments of the present invention, a screw presser comprising a wedgewire screen with a slot width of about 0.020 inches to about 0.025 inches can be used to mechanically dewater a pulp slurry.

Similarly, the design of the screw shaft can be advantageously selected so as to increase the efficiency of the dewatering process as well as to mitigate against irreversible structural changes to pulp contained in a pulp slurry. A screw shaft can comprise varying designs including but not limited to tapered shafts designs and/or designs wherein the screw flights have varying pitch. Without being limited by a theory, it is believed that increasing compression on a pulp slurry within the screw presser decreases the free water content of the resulting press cake. The compression on the pulp slurry can be increased by decreasing the pitch of the screw flights on the screw shaft and/or by using a tapered shaft wherein the distance between the shaft of the screw shaft and the filtration surface decreases as the pulp slurry is passed through the screw presser. In some embodiments of the present invention, a screw presser comprising a screw shaft with a pitch of about 10-20 degrees may be used to mechanically dewater a pulp slurry. In other embodiments of the present invention, a screw presser comprising a screw shaft with a pitch of about 20-25 degrees may be used to mechanically dewater a pulp slurry. In further embodiments of the present invention, a screw presser comprising a screw shaft with a pitch of about 25-35 degrees may be used to mechanically dewater a pulp slurry. The screw presser may be designed, however, in such a way that it can allow for more pressure to be against the screw head or the screen. When there is more pressure against the screen, however, there has been a better dewatering effect.

Chemical dewatering can comprise conditioning a pulp slurry with a flocculating agent prior to a filtration step. Wherein the flocculating agent comprises lime, the amount of lime used is an important consideration because it can have undesirable effects on the dehydrated pulp slurry of the present invention. Generally, the larger the ratio of lime to pulp slurry, the greater the dewatering effect. A concomitant effect of adding lime to a pulp slurry, however, can comprise an increased pulp slurry pH and, ultimately, an increase in the pH of products derived from said pulp slurry including, but not limited to, a dehydrated pulp slurry of the present invention. Wherein the pH of such a dehydrated pulp slurry is above about 4.3, there can be a potential for mold growth during storage and/or transportation, even when said dehydrated pulp product is vacuum packaged. To minimize said potential for mold growth, citric acid can be used to lower the pH of a chemically dewatered pulp slurry to a value that is not above about 4.3.

An additional or alternative effect of adding lime to a pulp slurry can comprise an increased pulp slurry calcium content and, ultimately, an increase in the calcium content of products derived from said pulp slurry including, but not limited to, a dehydrated pulp slurry product of the present invention. Wherein a pulp slurry is intended to be used for human consumption, the calcium content of said pulp slurry is an especially important consideration. Both foreign and domestic food regulatory agencies may have regulations limiting the calcium content of certain foods and/or food additives. Therefore, products derived from pulp slurry that has been chemically dewatered with lime may have a calcium content that is above a regulatory mandated maximum level. Wherein the dehydration process of the current invention comprises chemical dewatering with lime and wherein the dehydrated pulp slurry of the present invention is intended to be used for human consumption, with or without further processing, it is suggested that the amount of lime used results in a pulp slurry calcium concentration that is no more than about the intrinsic calcium content of the fruit from which the pulp was extracted. For example, orange juice contains about 2 wt % intrinsic amount of calcium and, therefore, it can be desirable to have a dewatered pulp slurry product that has a calcium concentration of no more than about 2 wt %.

In some embodiments of the present invention, wherein dehydration comprises chemical dewatering with lime, a reaction conveyer can be used to contact the lime and a pulp slurry. A reaction conveyor can comprise a doser, a first end, a second end, and a conveying surface disposed between the first end and second end. The pulp slurry can be deposited as a layer on the conveying surface at or near the first end and contacted with the lime by using a doser to deposit the lime on the pulp slurry layer. The pulp slurry/lime mixture can then be continually dewatered as it is conveyed from the first end of the reaction conveyor to the second end of the reaction conveyor. The ratio of dewatering composition to pulp slurry and the amount of the time the dewatering composition and pulp slurry remain in contact can affect the amount of vicinal water that can be extracted from the pulp slurry. In some embodiments of the present invention, a reaction conveyor may be used to chemically dewater a pulp slurry by contacting the pulp slurry and a dewatering composition comprising hydrated lime wherein the ratio of hydrated lime to pulp slurry is about no more than about 0.01 wt %, or no more than about 0.02 wt %, or no more than about 0.04 wt %. In some embodiments of the present invention, a reaction conveyor may be used to chemically dewater a pulp slurry by contacting the pulp slurry and a dewatering composition comprising hydrated lime wherein the pulp slurry and hydrated lime remain in contact generally for at least about 1 to about 10 minutes. Specifically, the pulp slurry and hydrated lime can be contacted for at least about 1 min to at least about 2 minutes, at least about 3 minutes to at least about 5 minutes, at least about 5 minutes to about 7 minutes, or at least about 5 to about 10 minutes.

2. Drying

In light of the fact that dewatering alone may not sufficiently dehydrate a pulp slurry so that it can be stored and/or shipped at ambient temperatures without spoilage, the dehydration process of the present invention can advantageously comprise a drying step. However, because it is a goal of the present invention to produce a dehydrated pulp product with natural characteristics, it is necessary that the drying process be a gentle drying process. The inventors have discovered that where the temperature of pulp in a de-sugared pulp slurry does not exceed about 60° C. or about 80° C., the dehydrated pulp slurry can be substantially free of said irreversible changes.

In the present invention, the drying methods that can be used include, but are not limited to, freeze drying, drum drying, microwave drying, spray drying, and fluidized bed drying. On such method, fluidized bed drying, can be advantageous because it is generally more efficient than other methods. A typical fluidized bed drier can comprise a product inlet, a product outlet, and a process chamber comprising at least one air inlet, at least one air outlet, and a fluid bed, said fluid bed being at least partially disposed between the product inlet and the product outlet. A pulp slurry can be continuously deposited on the fluid bed near the product inlet and is conveyed through the process chamber to the product outlet. Within the process chamber, the pulp slurry can be fluidized and dried as heated air, introduced through the air inlet, contacts the pulp slurry and causes it to behave like a fluid. Without being limited by a theory, it is believed that fluidizing can increase the contact area between a pulp slurry and a fluidizing gas and/or a and/or a pre-dried material in the fluidized pulp slurry, thereby resulting in a greater heat transfer and, ultimately increased drying efficiency.

The temperature of the fluidizing air can be advantageously selected to promote gentle drying of a pulp slurry. For example, in some embodiments of a fluid bed drier, it can be desirable to create a thermal gradient along the length of the fluid bed to promote gentle drying of a pulp slurry. A desirable gradient can be established wherein the temperature along the fluid bed is maximized near the middle of the process chamber, relative to the first end and second end of the fluid bed. Such a thermal gradient can be created by the distance of hot air travel down the bed so that the cooler temperature is further towards the end of the bed. However, there may also be air chambers found throughout the bed so that the hot air can be directed to certain areas. Additionally, the dryer also has an additional inlet for cool air to enter in order to cool down the material more quickly and protect the material from thermal breakdown. Without being limited by a theory, it is believed that by attenuating the rate of change of temperature experienced by a pulp slurry during heating and/or cooling, irreversible changes to the color, shape, and/or texture of pulp in a pulp slurry can be avoided. In some such embodiments of a fluidized bed drying process, the dryer inlet air temperature may be about 70° C. to about 90° C. or at least about 75° C. to about 80° C. while the exit air temperature may be about 50° C. to about 60° C. or about 50° C. to about 55° C.

In some embodiments of a fluidized bed drying process, drying can be made more efficient wherein said process further comprises a backmixing process. Backmixing can comprise mixing an initially dried pulp slurry and an incoming pulp slurry to form a backmix mixture. An initially dried pulp slurry is a pulp slurry that has undergone fluidized bed drying at least once. An incoming pulp slurry is a pulp slurry that has not undergone fluidized bed drying. Wherein a fluidized bed drying process of the present invention comprises backmixing, a first quantity of initially dried pulp slurry can be formed by drying a first portion of incoming pulp slurry using a fluid bed dryer. Subsequently, a backmix mixture can be formed by mixing at least a portion of the first quantity of initially dried pulp slurry with a second quantity of incoming pulp slurry. The resulting backmix mixture can be dried using a fluid bed drier. Without being limited by a theory, it is believed that incoming pulp slurry is dispersed by mixing it with initially dried pulp slurry, thereby decreasing the drying time and promoting even drying of the incoming pulp slurry.

The composition of the backmix mixture can be advantageously selected to promote drying efficiency. The amount of initially dried pulp slurry in a backmix mixture can affect the efficiency of a fluidized bed drying process. In some embodiments of the present invention, wherein the drying process comprises fluidized bed drying with backmixing, a backmix mixture can comprise about 30 to about 40 wt % initially dried pulp. In other such embodiments, the backmix mixture can comprise about 40 wt % to about 50 wt % initially dried pulp slurry. In yet further such embodiments, the backmix mixture can comprise about 50% to about 60% initially dried pulp slurry.

Similarly, the moisture content of both the initially dried pulp slurry and the incoming pulp slurry can also affect the efficiency of a fluidized bed drying process. In some embodiments of the present invention, wherein the dying process comprises fluidized bed drying with backmixing, the moister content of the incoming pulp slurry is no more than about 70 wt %, no more than about 85 wt %, or no more than about 95 wt % or no less than about 70 wt %, no less than about 75 wt % or no less than about 80 wt % of the pulp slurry. In some embodiments of the present invention, wherein the drying process comprises fluidized bed drying with backmixing, the moisture content of the initially dried pulp slurry is no more than about 50 wt %, or no more than about 55 wt %, or no more than about 60 wt % or no less than about 50 wt %, no less than about 45 wt % or no less than about 40 wt % of the pulp slurry.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

EXAMPLE

The following example(s) further describe and demonstrate embodiments within the scope of the present invention. The examples are given solely for the purpose of illustration and are not to be construed as limitations of the present invention, as many variations thereof are possible without departing from the spirit and scope of the invention.

Frozen orange pulp (FOP), 80-85% wt, was thawed under refrigerated temperature for 5-7 days in steel drums. Pulp wash was conducted in a tank with agitator. Water to FOP ratio is 2:1 and slow agitation for about 2-3 minutes. Three washes were required to achieve pulp slurry with very low sugar content, i.e., 0-0.5° Brix. Final pulp moisture content was 91-94% after screw presser.

Wash 1: 75 kg pulp+150 kg water, agitate for 2.5 minutes, then pump through turbo filter. Product out of turbo filter: 100 kg with ~3.5° Brix.

Wash 2: 100 kg pulp+200 kg water, agitate for 2.5 minutes, then pump through turbo filter. Product out of turbo filter: 100 kg with ~1.2° Brix.

Wash 3: 100 kg pulp+200 kg water, agitate for 2.5 minutes, then pump through turbo filter. Product out of turbo filter: 100 kg with ~0.2° Brix.

| Sample Number | wash 1 | Wash 2 | Wash 3 |
|---|---|---|---|
| 20 | 3.7-3.8 | 1.1-1.3 | 0.3 |
| 30 | 3.9-4.2 | 1.2-1.3 | 0.0 |
| 40 | 3.2-3.5 | 1.0-1.3 | 0.2 |
| 50 | 2.8-3.2 | 0.7-1.1 | 0.1 |

| Sample Number | Pulp Moisture Content (%) after turbo filter |
|---|---|
| 35 | 96.51 |
| 49 | 96.15 |

| Sample Number | Pulp Moisture Content (%) after Screw presser |
|---|---|
| P3 | 93.94 |
| P8 | 91.54 |

Backmixing based on 92% moisture content wet material with 50% moisture content dried material @ ratio of 1:1 wet to dried material base on weight.

| Extrusion (plate w/2.5 mm diameter holes) | Notes |
|---|---|
| 1 | Outlet dryer mc: 55.01% |
| 2 | Inlet dryer mc: 71.73% |
| 3 | Supply air: 57° C., Product temperature 36° C. exhaust air: 45° C. |
| 4 | Kg into dryer: 22.58 kg; kg out dryer: 13 kg |
| 5 | Kg into dryer: 25.8 kg; kg out dryer: 13.4 kg |
| 6 | Kg into dryer: 26.6 kg; kg out dryer: 14.9 kg |
| 7 | Outlet dryer mc: 51.4%, output kg: 16.4 kg |
| 8 | Outlet dryer mc: 51.2%, output kg: 14.2 kg |
| 9 | Outlet dryer mc: 45.2%, output kg: 15.3 kg |
| 10 | Inlet dryer mc: 66%; outlet dryer mc: 47.24% |
| 11 | Outlet dryer mc: 53.3%; input/output kg: 27.3/19.3 kg |
| 12 | Outlet dryer mc: 55.1%; input/output kg: 31.4/21.1 kg |
| 13 | Outlet dryer mc: 49.2%; input/output kg: 31.5/20.6 kg |
| 14 | Outlet dryer mc: 45.0%; input/output kg: 31.0/18.4 kg |

Initial results from pre-dryer/dryer method
Pre-drying on Teflon coated perforated plate for 30-45 minutes to reduce moisture from 90-94% mc to ~80% mc.

| Belt test Number | % mc to fluid bed | % mc after fluid bed |
|---|---|---|
| 2 | 79.74 | — |
| 3 | 84.1 | 53.93 |
| 4 | 72.27 | 20.40 |
| 6 | 79.32 | — |
| 7 | 82.90 | 25.72 |
| 8 | 73.05 | — |

Moisture content measurements after various pre-dryer tests

Due to backmixing requirement of the system, each pulp cell will recycle through the system an average of 20 times. A moisture content of ~70% in material after extrusion was found to be suitable for fluidization. Fluid bed dryer system uses hot air was heated with a direct fired natural gas burner. Effective fluid bed surface area was 1.05 m². Exhaust air was removed from the top of the bed through a light suction pressure and a cyclone before being vented to atmosphere. Rehydration in all three cases after fluid (belt tests 3, 4, & 7) showed complete rehydration within 25-30 minutes using warm water and mild agitation with no visible product damage. Samples to ~40% moisture content showed good rehydration.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40%" is intended to mean "about 40%".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a dehydrated fruit pulp slurry comprising:
   a) de-sugaring a fruit pulp slurry to produce a fruit pulp wash;
   b) dewatering said fruit pulp wash to produce a fruit press cake, said dewatering process comprising mechanical, chemical, or enzymatic dewatering, or any combination thereof; and
   c) dehydrating said fruit press cake to produce a dehydrated fruit pulp slurry with a moisture content less than about 10%, wherein said dehydrated fruit pulp slurry, when reconstituted, is substantially the same as it was prior to dehydration.

2. The process of claim 1 wherein de-sugaring said fruit pulp slurry results in a Brix level from about 0.1° Bx to about 0.5° Bx.

3. The process of claim 1 wherein de-sugaring comprises a multi-stage washing process including at least two washing stages.

4. The process of claim 1 wherein said chemical dewatering comprises contacting hydrated lime with said fruit pulp wash.

5. The process of claim 4 wherein contacting occurs for between about 1 and about 5 minutes.

6. The process of claim 4 wherein the hydrated lime and fruit pulp wash mixture comprises no more than about 0.02 wt % hydrated lime of the total weight of said mixture.

7. The process of claim 4 wherein said chemical dewatering occurs at a temperature of from 20 to 30° C.

8. The process of claim 1 wherein said mechanical dewatering comprises using a screw presser or a turbo filter.

9. The process of claim 8 wherein the screw presser comprises a wedgewire screen with a slot width ranging from about 0.0016 inches to about 0.0022 inches.

10. The process of claim 8 wherein the screw presser has a pitch of between about 20 degrees and 25 degrees.

11. The process of claim 1 wherein said dehydrating comprises using fluidized bed drying.

12. The process of claim 11 wherein fluidized bed drying comprises maintaining the temperature below about 80° C.

13. The process of claim 12 wherein fluidized bed drying occurs for between about 20 and about 30 minutes.

14. The process of claim 11 wherein fluidized bed drying comprises applying fluidized air with a temperature that is maximized near a middle of a process chamber of a fluidized bed together with a mechanical tumbling motion, thereby creating a thermal gradient along the length of the fluid bed to promote gentle drying of said de-sugared fruit pulp slurry.

15. The process of claim 11 wherein fluidized bed drying comprises using a thin layer produced by a mechanical extrusion process.

16. The process of claim 1, wherein said dehydrating process comprises:
   i) drying said fruit pulp press cake to a moisture content between about 40 wt % to about 60 wt % to produce a partially dehydrated fruit pulp slurry;
   ii) combining said partially dehydrated fruit pulp slurry with a fruit pulp wash; and
   iii) drying said combined fruit pulp slurry to produce a dehydrated fruit pulp slurry with a moisture content less than about 10%.

17. The process of claim 16, wherein combining comprises mixing said partially dehydrated fruit pulp slurry with a fruit pulp wash in about a 0.5:1 to about 1:1 ratio.

18. The process of claim 16, further comprising repeating steps (i)-(ii) from about 2 to about 20 times.

19. A dehydrated fruit pulp slurry, produced by the process of claim 1.

20. The process of claim 1 wherein said dehydrated fruit pulp slurry has a moisture content of less than about 8%.

21. The process of claim 1 wherein said dehydrated fruit pulp slurry has a moisture content of less than about 6%.

22. An article comprising a reconstituted, dehydrated fruit pulp slurry produced by the process of claim 1.

* * * * *